(12) United States Patent
Iwashima et al.

(10) Patent No.: US 7,884,516 B2
(45) Date of Patent: Feb. 8, 2011

(54) MOTOR

(75) Inventors: Shingo Iwashima, Nagano (JP);
Takeyoshi Miyashita, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/038,898

(22) Filed: Feb. 28, 2008

(65) Prior Publication Data
US 2008/0238229 A1 Oct. 2, 2008

(30) Foreign Application Priority Data
Mar. 30, 2007 (JP) .............................. 2007-090048

(51) Int. Cl.
*H02K 5/16* (2006.01)
*H02K 5/00* (2006.01)
*H02K 1/04* (2006.01)
*H02K 1/12* (2006.01)

(52) U.S. Cl. .................... 310/90; 310/40 MM; 310/43; 310/91; 310/254.1; 310/257

(58) Field of Classification Search .................. 310/90, 310/40 MM, 91, 42, 43, 254.1, 257
See application file for complete search history.

(56) References Cited

U.S. PATENT DOCUMENTS

| | | | | |
|---|---|---|---|---|
| 4,471,246 A | * | 9/1984 | Paillet | 310/42 |
| 6,060,807 A | * | 5/2000 | Saito et al. | 310/91 |
| 6,825,587 B2 | * | 11/2004 | Yajima et al. | 310/90 |
| 2006/0028078 A1 | * | 2/2006 | Agematsu | 310/90 |
| 2006/0108885 A1 | | 5/2006 | Nishimura | |
| 2007/0222313 A1 | * | 9/2007 | Sonohara et al. | 310/90 |

FOREIGN PATENT DOCUMENTS

JP 2006-129649 5/2006

* cited by examiner

*Primary Examiner*—Quyen Leung
*Assistant Examiner*—Jose A Gonzalez Quinones
(74) *Attorney, Agent, or Firm*—Cantor Colburn LLP (57) ABSTRACT

A motor may include a rotor provided with a rotor shaft, a cylindrical bearing made of resin material and provided with a bearing part for rotatably supporting a shaft end of the rotor shaft, and a bearing holder provided with a through-hole into which the cylindrical bearing is inserted. The cylindrical bearing is slidably held in the through-hole and at least one of a first end face where the bearing part is formed and a second end face which is an opposite end face to the first end face is formed with a ring-shaped groove. Therefore, a wall thickness of resin for forming the bearing can be made thinner and thus shrinkage of the side wall part of the bearing which faces an inner peripheral face of the through-hole of the bearing holder is reduced.

6 Claims, 5 Drawing Sheets

MOTOR

CROSS REFERENCE TO RELATED APPLICATION

The present invention claims priority under 35 U.S.C. §119 to Japanese Application No. 2007-90048 filed Mar. 30, 2007, which is incorporated herein by reference.

FIELD OF THE INVENTION

An embodiment of the present invention may relate to a motor and, more specifically, relate to a motor provided with a bearing, which is formed by injection molding, for supporting a shaft end of a rotation shaft.

BACKGROUND OF THE INVENTION

Conventionally, a motor which is used in a digital camera or the like has been known in which a lead screw is formed on its rotation shaft (see, for example, Japanese Patent Laid-Open No. 2006-129649).

As described in the above-mentioned Patent Reference, both ends of the rotation shaft of the motor are supported by bearings through a ball. The bearing supporting a shaft end on a rotor side of the rotation shaft is a cylindrical member which is made of resin. The bearing is inserted into a through-hole of a bearing holder made of resin which is fixed to a stator of the motor and the bearing is urged on a rotor side by a plate spring (urging member). Further, a recessed part (bearing part) is formed on an end face on the rotation shaft side of the bearing and a ball is fitted into the recessed part.

The bearing is designed so that the bearing is held within the through-hole of the bearing holder in a state that a prescribed minute clearance is maintained.

However, as described above, the bearing is formed of resin by injection molding. Therefore, when molding material is cooled and solidified in the molding step, deformation (shrinkage) may occur by contraction of the molding material. Especially, when inexpensive resin material is used, shrinkage having occurred becomes larger and thus cylindricality of the bearing is largely deteriorated. As a result, when the bearing having the above-mentioned shrinkage is fitted to the bearing holder, a clearance between the bearing and the through-hole of the bearing holder increases to cause a larger torque loss, or larger noise or vibration during rotation of the motor.

SUMMARY OF THE INVENTION

In view of the problems described above, an embodiment of the present invention may advantageously provide a motor in which a concentricity of a rotor shaft of a motor and its bearing is improved by improving a cylindricality of the bearing and, as a result, a torque loss, noise, vibration or the like during driving of the motor can be reduced.

Thus, according to an embodiment of the present invention, there may be provided a motor including a rotor which is provided with a rotor shaft, a stator which is disposed on an outer peripheral side of the rotor, a cylindrical bearing which is made of resin material and which is provided with a bearing part for rotatably supporting a shaft end of the rotor shaft, and a bearing holder which is provided with a through-hole into which the cylindrical bearing is inserted. The cylindrical bearing is slidably held in the through-hole and at least one of a first end face where the bearing part is formed and a second end face which is an opposite end face to the first end face is formed with a ring-shaped groove.

According to the embodiment of the present invention structured as described above, the ring-shaped groove is formed on one of the end faces of the cylindrical bearing and thus a wall thickness of resin for forming the bearing can be made thinner. Therefore, shrinkage of the side wall part of the bearing which faces an inner peripheral face of the through-hole of the bearing holder is considerably reduced. Accordingly, even when resin material which relatively easily occurs shrinkage is used, a motor with a high degree of quality and which is superior in concentricity of the rotor shaft of the motor with the bearing can be obtained. Further, the clearance between the cylindrical bearing and the bearing holder is prevented from increasing, and a torque loss, noise, vibration or the like during driving of the motor can be reduced.

In accordance with an embodiment of the present invention, the bearing part is a circular recessed part which is formed at a center of the first end face where the bearing part is formed and the groove is formed so as to surround the circular recessed part. According to the embodiment structured as described above, shrinkage of the side wall part of the bearing which faces the inner peripheral face of the through-hole of the bearing holder is decreased and, in addition, shrinkage of the circular recessed part which is the bearing part is decreased and thus rotational accuracy of the motor can be further enhanced.

In accordance with an embodiment of the present invention, a depth of the groove is substantially equal to or larger than a depth of the circular recessed part. Further, it is preferable that a thickness (D1) between the groove and the side wall part of the cylindrical bearing, which faces an inner peripheral face of the through-hole, is thinner than a width of the groove, and a thickness (D2) between the groove and the circular recessed part is thinner than the width of the groove. According to the embodiment structured as described above, a wall thickness of resin which forms the bearing is made thinner and thus shrinkage occurring in the entire bearing is further reduced. In addition, a wall thickness of a portion forming the circular recessed part can be made thinner and equalized and thus the cylindricality of the circular recessed part can be further improved.

Further, it is preferable that a gate trace from which molding material for forming the cylindrical bearing is injected is formed at a center of the second end face which is the opposite end face to the first end face. When resin material is injected from the center of the cylindrical bearing as described above, molten resin which is raw material flows within a cavity of a molding die with an axial line of the cylindrical bearing as its center. Therefore, the bearing that is a molded product can be obtained with a high degree of circularity.

In this case, it may be structured that the second end face of the cylindrical bearing is urged in an axial direction of the rotor shaft by an urging member. According to the structure as described above, a motor in which the rotor shaft is supported in a stable state can be obtained. In addition, it may be structured that the cylindrical bearing is slidably held within the through-hole in a state that the side wall part of the cylindrical bearing is maintained with a predetermined clearance to an inner peripheral face of the through-hole. According to the structure as described above, a state urged by the urging member in the through-hole of the bearing holder can be maintained and thus the rotor shaft can be supported in a further stable state.

In accordance with an embodiment of the present invention, a thickness (D1) between the groove and the side wall part of the cylindrical bearing, which faces the inner peripheral face of the through-hole, is roughly equal to a thickness (D2) between the groove and the circular recessed part which is formed at a center of the first end face. Further, it is preferable that a thickness (D3) between a bottom face of the groove and the first end face or the second end face is roughly equal to the thickness (D1) between the groove and the side wall part of the cylindrical bearing and the thickness (D2) between the groove and the circular recessed part. According to the structure as described above, a shrinkage quantity of resin can be made roughly uniform in the cooling process at the time of injection molding for the bearing. Therefore, deterioration of the cylindricality of the entire bearing and the cylindricality of the circular recessed part can be restrained and a torque loss, noise, vibration or the like during driving of the motor can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5(a) and 5(b) are perspective outward appearance views showing the bearing in which a groove is formed on a pressurization face, which is the opposite face to the bearing shown in FIGS. 3(a) and 3(b) and FIGS. 4(a) through 4(c).

DETAILED DESCRIPTION OF THE PREFERRED EMBODIMENTS

A motor in accordance with an embodiment of the present invention will be described in detail below with reference to the accompanying drawings.

Figure 1A:
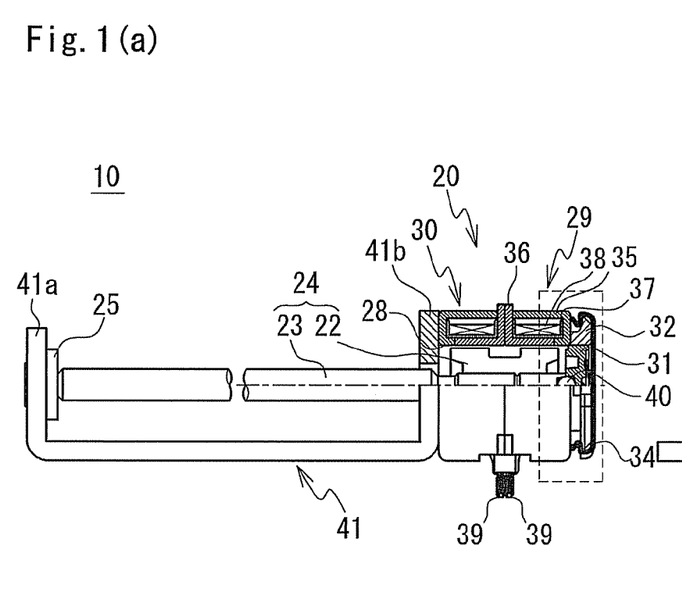
FIG. 1(a) is a partially cross-sectional side view showing a motor in a longitudinal direction in accordance with an embodiment of the present invention and FIG. 1(b) is a side view showing the motor in a widthwise direction.
Figure 1B:
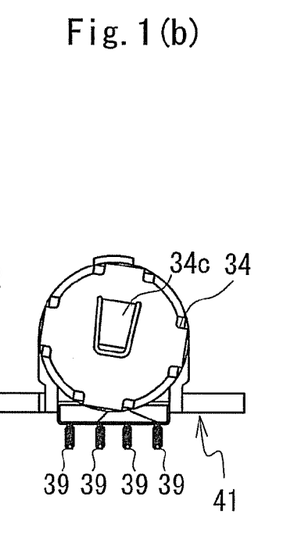
Figure 2:
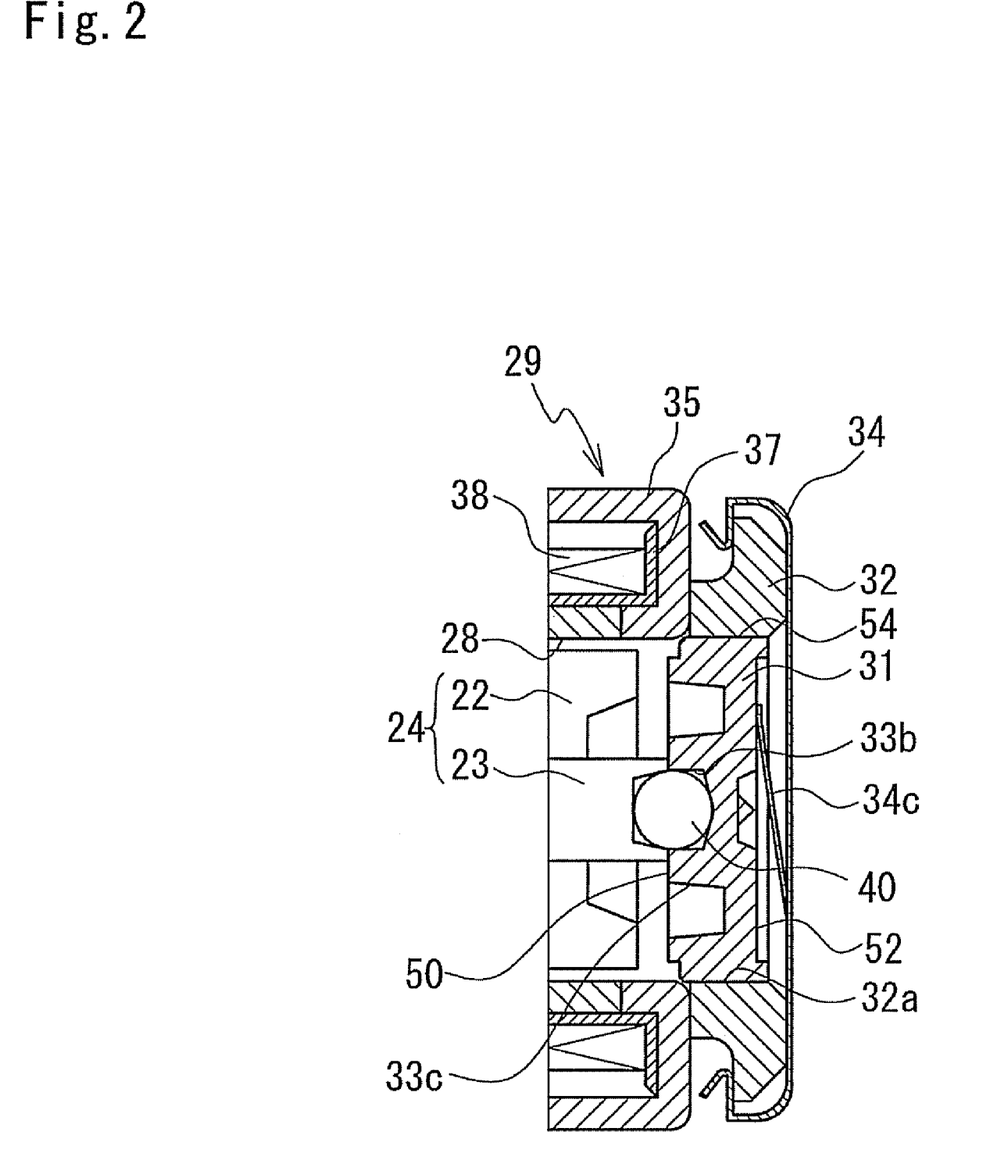
FIG. 2 is an enlarged cross-sectional view showing an essential portion (structure surrounding a bearing) of the motor shown in FIG. 1(a).

First, an entire structure of a motor 10 in accordance with an embodiment of the present invention will be described with reference to FIGS. 1(a) and 1(b) and FIG. 2. FIG. 1(a) is a partially cross-sectional side view showing the motor 10 in a longitudinal direction in accordance with an embodiment of the present invention and FIG. 1(b) is a side view showing the motor 10 in a widthwise direction. FIG. 2 is an enlarged cross-sectional view showing an essential portion of the motor in this embodiment and an enlarged cross-sectional view showing a portion which is surrounded by the dotted line in FIG. 1(a).

The motor 10 in accordance with this embodiment includes a stator 20, a rotor 24 provided with a rotor magnet 22 which is fixed to a rotor shaft 23, a bracket 41 which is fixed to the stator 20, a first bearing 25 and a second bearing 31 for rotatably supporting the rotor shaft 23, and a bearing holder 32 by which the second bearing 31 is supported.

The stator 20 is provided with a pair of stator core assemblies 29 and 30 which are formed with a rotor penetrating hole 28 through which the rotor 24 is passed and which are superposed on each other in an axial direction of the rotor shaft 23 to be formed in a two-layer structure in this embodiment. The structures of the stator core assemblies 29 and 30 are the same each other and thus only the stator core assembly 29 will be described below and a description of the stator core assembly 30 is omitted.

The stator core assembly 29 is formed with an outer yoke 35 which structures a part of an outer wall (case body) of the stator 20 and an inner yoke 36 which is disposed on an inner side in the axial direction of the outer yoke 35. A coil bobbin 37 around which a winding 38 is wound is disposed in a hollow part which is formed by the outer yoke 35 and the inner yoke 36. End parts of the winding 38 are wound around input and output terminals 39 for controlling the motor 10.

The rotor penetrating hole 28 is formed at a center of the inner yoke 36. A plurality of pole teeth which is bent from an inner peripheral edge of the rotor penetrating hole 28 and which is disposed so as to face the rotor magnet 22 is formed in a standing-up manner and in a juxtaposed state in the circumferential direction. Similarly to the inner yoke 36, the outer yoke 35 is formed with the rotor penetrating hole 28 in its center. A plurality of pole teeth which is bent from an inner peripheral edge of the rotor penetrating hole 28 and which is disposed so as to face the rotor magnet 22 is formed in a standing-up manner and in a juxtaposed state in the circumferential direction. In addition, the outer yoke 35 is formed with an outer wall which is bent in an axial direction from its outer peripheral edge for covering an outer periphery of the winding 38 to be also used as a case body of the motor. Further, the pole teeth of the inner yoke 36 and the pole teeth of the outer yoke 35 both of which are extended in the axial direction are disposed on an inner peripheral face of the coil bobbin 37 so as to be alternately juxtaposed in the circumferential direction.

The rotor 24 includes the rotor shaft 23 and the rotor magnet 22 fixed to the rotor shaft 23. The rotor 24 is structured to rotate under a magnetic field which is generated by energization to the winding 38. Further, an outer peripheral face of the rotor shaft 23 protruding from the stator 20 is formed with a lead screw not shown.

The bracket 41 is formed of a metal plate member. A first support portion 41a and a second support portion 41b are formed at both ends of the bracket 41 in a standing-up manner by press working so that a cross section of the bracket 41 is formed in a "U"-shape. Further, the bracket 41 is fixed to the stator core assembly 30. A fixing method for the bracket 41 is not limited to a specified method but, for example, a fixing method such as a spot welding may be utilized.

The first bearing 25 and the second bearing 31 are structural members for rotatably supporting the rotor shaft 23. The first bearing 25, which is a bearing on an output side of the motor 10, is fixed to the first support portion 41a of the bracket 41 to rotatably support an end part on the output side of the rotor shaft 23. On the other hand, the second bearing 31 whose structure will be described in detail below is inserted into a bearing hole 32a (which corresponds to a through-hole in the present invention). The bearing hole 32a is formed in the bearing holder 32 so as to have the same diameter as a diameter of the rotor penetrating hole 28 and the second bearing 31 rotatably supports an end part on an opposite-to-output side of the rotor shaft 23.

Figure 4A:
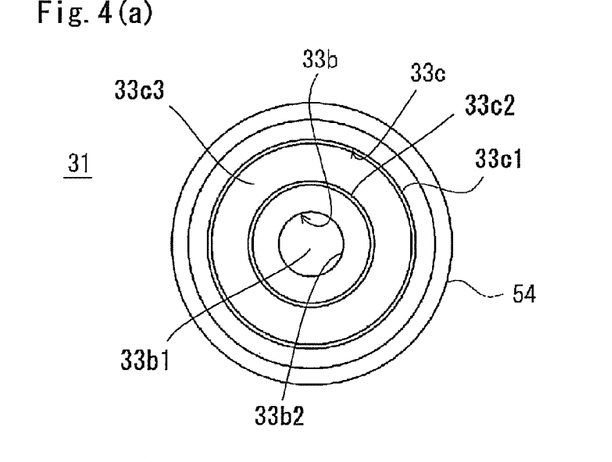
FIG. 4(a) is a top plan view showing the bearing shown in FIG. 3(a)
Figure 4B:
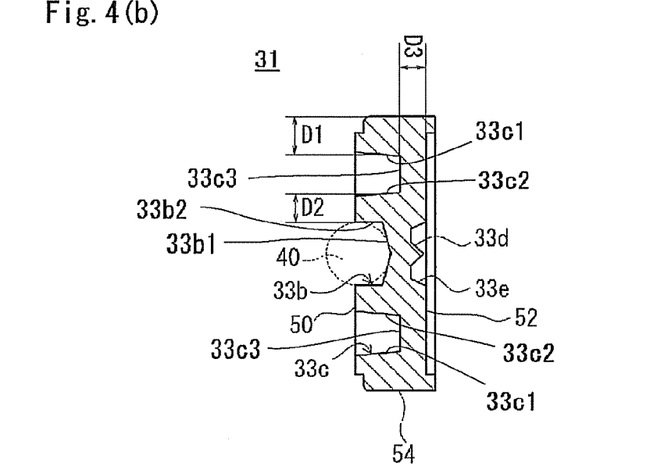
FIG. 4(b) is a cross-sectional view showing the bearing shown in FIG. 4(a)

As shown in FIG. 2, a rotor shaft support face 50 which is a bearing part of the second bearing 31 is formed with a support recessed part 33b which is a circular bottomed hole (which corresponds to a circular recessed part in the present invention). A ball 40 which is fitted into an end of the rotor shaft 23 is rotatably fitted to the support recessed part 33b. During driving of the motor 10, as shown in FIG. 4(b), the ball 40 is abutted with a circular cone-shaped bottom part 33b1 of the support recessed part 33b, and the ball 40 is rotated in a state that a minute clearance is maintained between the ball 40 and an inner wall face 33b2 of the support recessed part 33b which is substantially perpendicularly recessed in the direction perpendicular to the rotor shaft support face 50.

A minute clearance with a prescribed gap is formed between an inner wall face of the bearing hole 32a formed in the bearing holder 32 and a side wall part 54 of the second bearing 31. The second bearing 31 is urged to the rotor 24 by an urging piece 34c of the urging member 34 which is fitted to the bearing holder 32 so as to cover the bearing holder 32. In the present embodiment, the urging piece 34c urges the second bearing 31 by abutting at a position deviated from the center of the second bearing 31. Therefore, the second bearing 31 is fitted to the bearing holder 32 in a slightly inclined state with respect to the axial line of the rotor shaft 23 by an amount of the clearance. Therefore, the motor 10 is designed in consideration of the inclination of the second bearing 31 which is occurred by the urging of the urging piece 34c.

The bearing holder 32 which holds the second bearing 31 is fixed to the stator core assembly 29. A fixing method for the bearing holder 32 is not limited to a specified method but, for example, a fixing method such as a spot welding may be utilized. Further, a sintered stainless steel or the like may be used as material for the bearing holder 32.

Figure 3A:
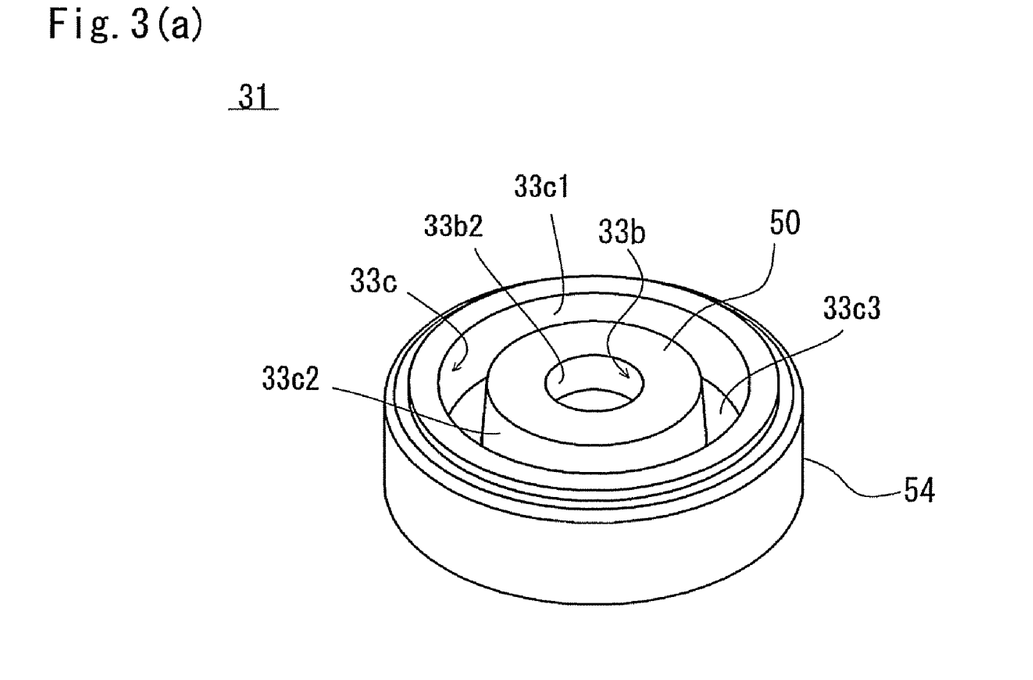
FIG. 3(a) is a perspective outward appearance view showing the bearing used in the motor shown in FIG. 1(a) which is viewed from a side where a support recessed part (circular recessed part) is formed.
Figure 3B:
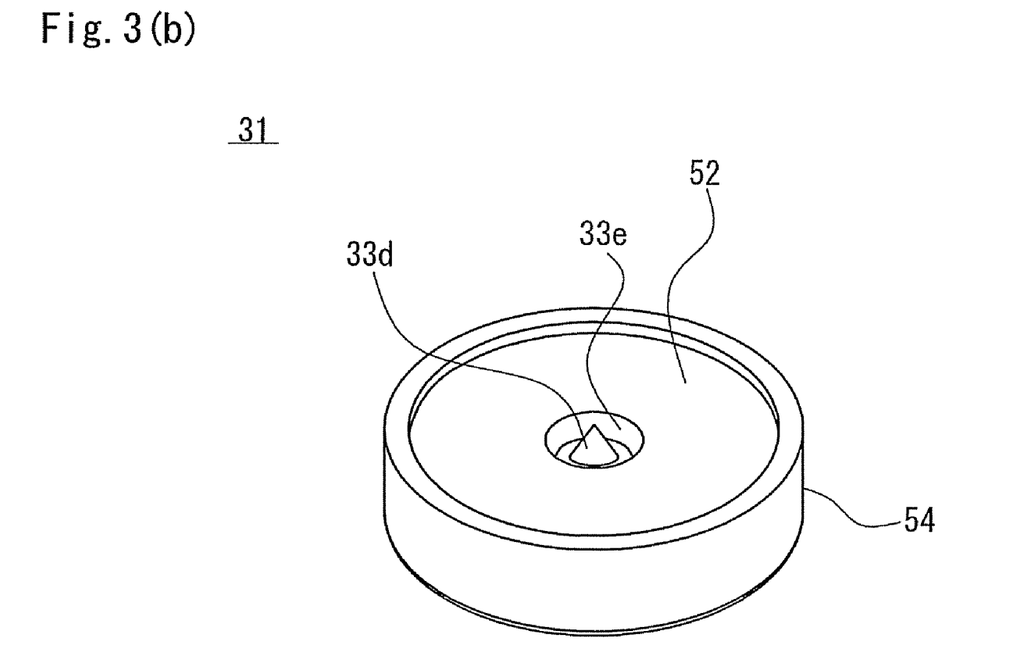
FIG. 3(b) is a perspective outward appearance view showing the bearing which is viewed from its opposite side.
Figure 4C:
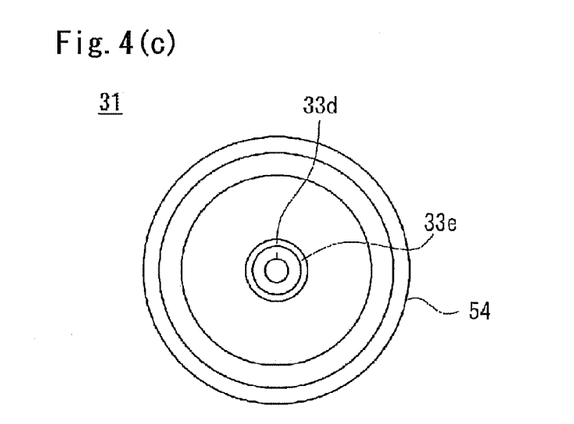
FIG. 4(c) is a bottom view showing the bearing shown in FIG. 3(a).

The second bearing 31 used in the motor 10 structured as described above will be described in detail below with reference to FIGS. 3(a) and 3(b) and FIGS. 4(a) through 4(c). FIG. 3(a) is a perspective outward appearance view showing the second bearing 31 which is viewed from a side where the support recessed part 33b is formed. FIG. 3(b) is a perspective outward appearance view showing the second bearing 31 which is viewed from its opposite side. FIG. 4(a) is a top plan view showing the second bearing 31, FIG. 4(b) is a cross-sectional view showing the second bearing 31, and FIG. 4(c) is a bottom view showing the second bearing 31.

The second bearing 31 is a cylindrical shaped member which is molded by injection molding with the use of raw material of Polybutylene terephthalate (PBT) resin, polythioethersulfone (denaturation PPE), or resin comprised of polythioethersulfone/polyester resin compositions containing the above-mentioned resins. Further, as described above, the support recessed part 33b for engaging with the ball 40 is formed at the center portion of the rotor shaft support face 50 which is located on the rotor shaft 23 side.

In addition, the rotor shaft support face 50 of the second bearing 31 is formed with a groove 33c having a prescribed width and whose depth is larger than a depth of the support recessed part 33b. The groove 33c is circumferentially formed so as to surround the support recessed part 33b with an axial line of the support recessed part 33b of the second bearing 31 as a center axis. The groove 33c includes a groove bottom part 33c3, which is formed in a substantially parallel to the rotor shaft support face 50, and an outer side face 33c1 and an inner side face 33c2 which are extended from the groove bottom part 33c3 to the rotor shaft support face 50. In this embodiment, the outer side face 33c1 and the inner side face 33c2 are formed from the rotor shaft support face 50 to the groove bottom part 33c3 in a mortar shape but they may be formed to be substantially perpendicular to the groove bottom part 33c3.

As described above, a wall thickness of resin which forms the second bearing 31 is made thinner by forming the ring-shaped groove 33c in the second bearing 31. Therefore, contracting amount of resin becomes small and thus the shrinkage quantity of resin of the second bearing 31 in a cooling process at the time of injection molding is remarkably reduced in comparison with a case where the groove 33c is not formed. Further, as shown in FIG. 4(b), the groove 33c is formed so that wall thicknesses of respective portions of the second bearing 31 are set to be thinner than a width dimension (width dimension of the groove bottom part 33c3) or a depth dimension (length dimensions of the outer side face 33c1 and the inner side face 33c2) of the groove 33c. In other words, the wall thickness "D1" between the side wall part 54 and the outer side face 33c1 of the groove 33c, the wall thickness "D2" between the inner side face 33c2 of the groove 33c and the inner wall face 33b2 of the support recessed part 33b, and the wall thickness "D3" between the groove bottom part 33c3 of the groove 33c and the pressurization face 52 are respectively set to be thinner than the width dimension and/or the depth dimension of the groove 33c. In the embodiment shown in FIGS. 4(a) through 4(c), the wall thickness "D1" is set to be thicker than the wall thickness "D2" and the wall thickness "D3". However, it is further preferable that the wall thicknesses of the respective portions are substantially equal to one another (D1≈D2≈D3). As described above, when the respective portions are formed so that their wall thicknesses are set to be substantially equal to one another, the shrinkage quantities of resin of the respective portions of the second bearing 31 may become substantially equal to one another in a cooling process at the time of injection molding.

As described above, in comparison with a bearing having a conventional structure, a dimensional accuracy of the second bearing 31, i.e., a cylindricality of the side wall part 54 of the second bearing 31 is not decreased by the occurrence of shrinkage. Therefore, the second bearing 31 is held by the bearing hole 32a of the bearing holder 32 in a state that a prescribed clearance is maintained. Accordingly, the concentricity of the second bearing 31 with the rotor shaft 23 can be improved and thus torque loss, noise, vibration or the like of the motor 10 can be prevented and a motor with a sufficient performance can be obtained.

Further, as described above, the groove 33c is formed on an outer peripheral side of the support recessed part 33b and the depth of the groove 33c is larger than the depth of the support recessed part 33b (length of the inner wall face 33b2 of the support recessed part 33b). Therefore, shrinkage occurring in the inner wall face 33b2 of the support recessed part 33b can be reduced as well as the side wall part 54. In other words, in this embodiment, the depth of the groove 33c (length of the inner side face 33c2) is formed to be substantially the same or larger than the depth of the inner wall face 33b2 of the support recessed part 33b. Therefore, the wall thickness (dimension "D2" in FIG. 4(b)) of the portion forming the support recessed part 33b becomes to be thinner and is substantially equalized and thus shrinkage occurring in the inner wall face 33b2 of the support recessed part 33b is reduced and decrease of cylindricality due to shrinkage of the inner wall face 33b2 of the support recessed part 33b is restrained. Accordingly, a prescribed clearance between the ball 40 and the inner wall face 33b2 of the support recessed part 33b is maintained and thus it is prevented from occurring noise or vibration due to contacting of the ball 40 with the inner wall face 33b2 of the support recessed part 33b during the motor is driven.

In this embodiment, the dimensions of the width of the groove 33c (width of the groove bottom part 33c3) and the depth of the groove 33c (lengths of the outer side face 33c1 and the inner side face 33c2) are not limited to specified values. However, when strength as a bearing can be sufficiently secured, it is preferable that the width and the depth of the grooves 33c are set to be larger as much as possible. According to the structure as described above, the wall thicknesses of resin forming the respective portions of the second bearing 31 becomes further thinner. Therefore, shrinkage at the time of molding of the side wall part 54 and the inner wall face 33b2 of the support recessed part 33b of the second bearing 31 is further reduced. Further, also in this case, when the wall thicknesses of the respective portions of the second bearing 31 are set to be substantially equal to each other, shrinkage quantities of the respective portions can be equalized and thus cylindricality of the side wall part 54 of the second bearing 31 and cylindricality of the inner peripheral face 33b2 of the support recessed part 33b can be further enhanced.

On the other hand, in the injection molding step, the second bearing 31 is molded by resin material which is injected at the center position of the pressurization face 52 which is the opposite face to the rotor shaft support face 50 and is urged by the urging part 34c of the urging member 34. Therefore, a molding material injection gate trace 33d which is left when the second bearing 31 is formed by injection molding is formed at the center of the pressurization face 52.

As described above, in this embodiment, the molding material is injected from the center of the pressurization face 52. This is because there is a possibility that, when molding material is injected from a position shifted from the center of the pressurization face 52, flowing of the resin material in a cavity of a molding die becomes uneven to cause the circularity of the second bearing 31 to deteriorate. In other words, in the present embodiment, since the resin material is injected from the center position of the second bearing 31, the molten resin which is raw material is flown within the cavity of the molding die with the axial line of the second bearing 31 as the center. Therefore, the circularity of the second bearing 31 which is a molded product can be enhanced.

On the other hand, as can be seen from FIG. 4(b), the molding material injection gate trace 33d is formed within the recessed part 33e so as not to protrude from the pressurization face 52. In this case, the depth of the recessed part 33e is set in consideration of an injection amount of resin material to the molding die when the second bearing 31 is molded, a size of an ejection nozzle, and characteristics of the resin material (viscosity, curing characteristic and the like).

As described above, the molding material injection gate trace 33d is not protruded from the pressurization face 52. Therefore, the molding material injection gate trace 33d does not abut with the urging piece 34c of the urging member 34. Accordingly, the second bearing 31 is urged in the direction of the rotor shaft 23 under the stable state that the urging piece 34c and the pressurization face 52 are face-contacted with each other.

Further, the motor of this kind which is used in a digital camera or the like is extremely small and thus it is not easy to recognize presence or absence of the support recessed part 33b formed in the second bearing 31 by visual observation. Especially, when the recessed part 33e is formed on the pressurization face 52, the shapes of the support recessed part 33b and the recessed part 33e are remarkably resembled each other. Therefore, at the time of assembling of the motor 10, it is difficult for an operator to precisely recognize which is the rotor shaft support face 50 where the support recessed part 33b is formed and mount the second bearing 31 so that the rotor shaft support face 50 is faced on the rotor shaft 23 side.

On the contrary, in this embodiment, the groove 33c is formed on the rotor shaft support face 50 of the second bearing 31 and thus the rotor shaft support face 50 can be easily recognized by visual observation. Therefore, assembling defectiveness of the motor 10 in which the second bearing 31 is mounted reversely can be remarkably reduced.

In the embodiment described above, the groove 33c is formed on the rotor shaft support face 50 of the second bearing 31. However, the present invention is not limited to this embodiment.

Figure 5A:
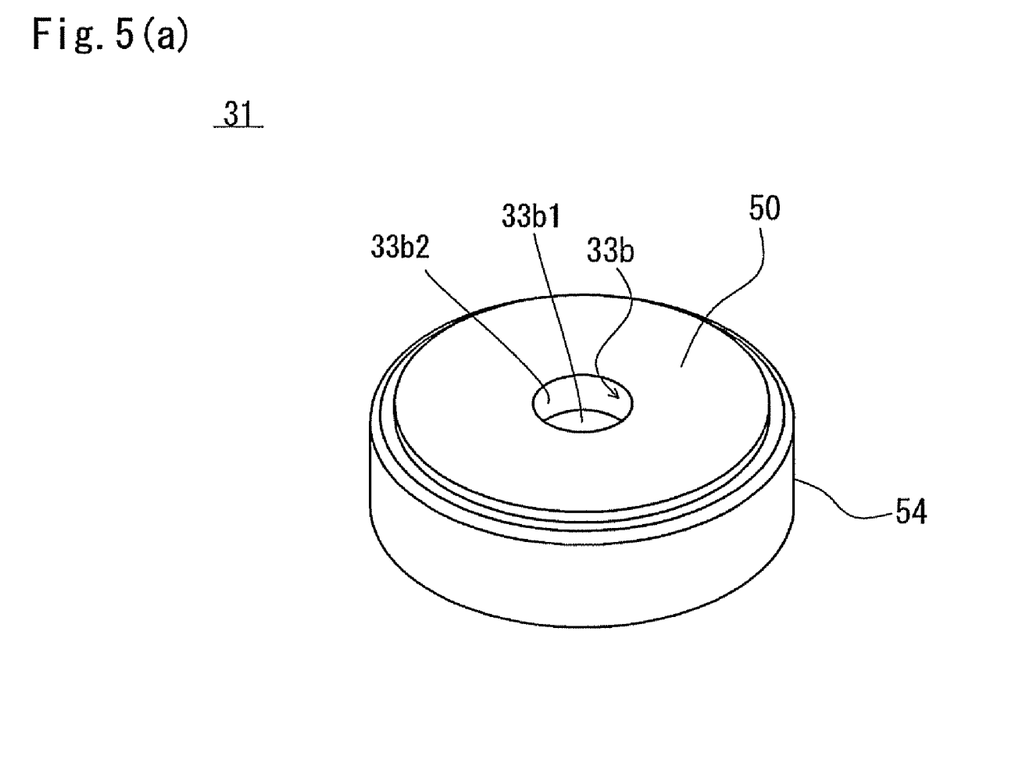
FIG. 5(a) is a perspective outward appearance view showing the bearing which is viewed from the side where the support recessed part (circular recessed part) is formed.
Figure 5B:
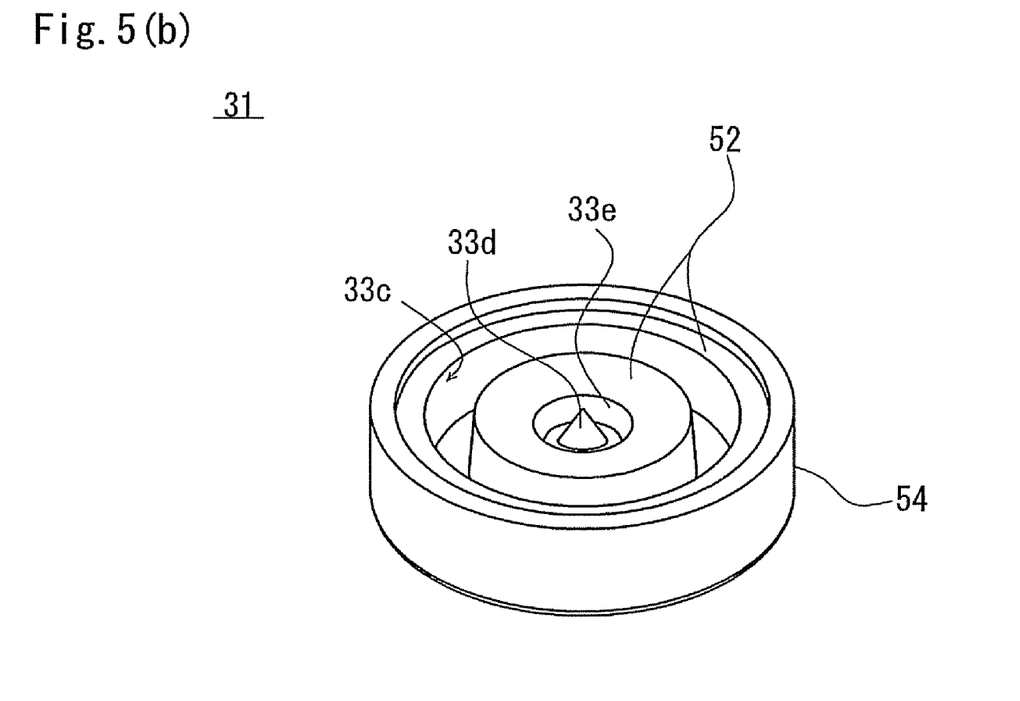
FIG. 5(b) is a perspective outward appearance view showing the bearing which is viewed from the opposite side.

For example, as shown in FIGS. 5(a) and 5(b), even when the groove 33c is formed on the pressurization face 52 of the second bearing 31, wall thickness of resin which forms the second bearing 31 can be equalized and made thinner. Therefore, shrinkage at the time of molding of the side wall part 54 of the second bearing 31 can be reduced. The groove 33c is formed so as not to locate at the position where the urging piece 34c for urging the second bearing 31 to the direction of the rotor shaft 23 is abutted.

In this case, contrary to the above-mentioned embodiment, the rotor shaft support face 50 is recognized as the opposite face to the face where the groove 33c is formed. Therefore, assembling failure can be remarkably reduced in which discrimination between the support recessed part 33b and the recessed part 33e is mistaken to cause the second bearing 31 to attach in a reverse manner.

As described above, according to the motor 10 in accordance with this embodiment, the ring-shaped groove 33c is formed on one of the end faces (the rotor shaft support face 50 or the pressurization face 52) of the second bearing 31 in a cylindrical shape. Therefore, the wall thickness of resin for forming the second bearing 31 (wall thicknesses of "D1", "D2" and "D3") is made to be equalized and thinner. As a result, shrinkage quantity of the sidewall part 54 facing the inner peripheral face of the through-hole of the bearing holder can be made smaller and thus a motor with a high degree of quality whose coaxiality of the rotor shaft 23 of the motor 10 with the second bearing 31 is satisfactory can be obtained even when inexpensive resin material is used in which shrinkage is easy to occur.

Further, the groove 33c is formed so as to surround the support recessed part 33b and the depth of the groove 33c (lengths of the outer side face 33c1 and the inner side face 33c2) is larger than the depth of the support recessed part 33b (length of the inner wall face 33b2). Therefore, the wall thickness of resin forming the second bearing 31 becomes further thinner and thus shrinkage occurred in the entire second bearing 31 can be further made smaller. In addition, since the wall thickness "D2" of the portion forming the support recessed part 33b is made to be thinner and equalized, decreasing of cylindricality of the inner wall face 33b2 of the support recessed part 33b due to shrinkage can be restrained.

Further, the second bearing 31 is molded with resin as raw material which is injected to its center position. Therefore, molten resin which is the raw material flows within the cavity of a molding die with the axial line of the second bearing 31 as its center and thus circularity of the second bearing 31 can be enhanced.

In addition, the second bearing 31 is urged by the urging member 34 in the axial direction of the rotor shaft 23. Therefore, a motor with a high degree of quality in which the rotor shaft 23 is supported in a stable state can be obtained.

The present inventions have been described in detail by using the embodiments, but the present inventions are not limited to the embodiments described above and many modifications can be made without departing from the scope of the invention.

For example, in the embodiment described above, the second bearing 31 is formed with polybutylene terephthalate (PBT) resin or the like but the present invention is not limited to this embodiment. In other words, resin which is capable of obtaining a sufficient strength as a bearing may be utilized and a bearing with a high degree of dimensional accuracy can be obtained even when inexpensive material is used where shrinkage relatively easily occurs.

Further, in the embodiment described above, the urging piece 34c urges the second bearing 31 by abutting at a deviated position from the center of the second bearing 31. However, as another urging method, the urging piece 34c may urge the center of the second bearing 31 in the axial direction of the rotor shaft 23 and, also in this case, the present invention can be applied. In other words, in the motor in which this urging method is utilized, it is designed so that the second bearing 31 is attached so as not to be inclined with respect to the bearing holder 32 and, so that a clearance with a constant width is formed between the side wall part 54 and the bearing hole 32a so as not to occur noise and vibration during driving of the motor. Therefore, when the present invention is applied to the motor having the structure as described above, the clearance having the constant width is prevented from varying due to shrinkage occurring in the second bearing 31 and thus a motor with a high degree of performance and quality can be attained.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor which is provided with a rotor shaft;
   a stator which is disposed on an outer peripheral side of the rotor;
   a cylindrical bearing, which is made of resin material, comprising:
      a first end face which is formed with a circular recessed and bottomed part as a bearing part for rotatably supporting a shaft end of the rotor shaft;
      a second end face which is an opposite end face to the first end face in an axial direction of the rotor shaft; and
      a side wall part which forms an outer peripheral face between the first end face and the second end face; and
   a bearing holder which is provided with a through-hole into which the side wall part of the cylindrical bearing is slidably inserted;
   wherein the first end face is formed to be perpendicular to the side wall part of the cylindrical bearing and the circular recessed and bottomed part is formed with a cylindrical inner wall face which is cylindrically recessed from the first end face;
   wherein the first end face of the cylindrical bearing is formed with a ring-shaped groove which is recessed from the first end face at a position between the circular recessed and bottomed part and the side wall part so as to surround the circular recessed and bottomed part; and
   wherein a depth from the first end face of the ring-shaped groove is substantially equal to or larger than a depth from the first end face of the circular recessed and bottomed part
   wherein a thickness (D1) between the ring-shaped groove and the side wall part of the cylindrical bearing is thinner than a width of the ring-shaped groove and a thickness (D2) between the ring-shaped groove and the cylindrical inner wall face of the circular recessed and bottomed part is thinner than the width of the ring-shaped groove;
   thereby both of cylindricality of the side wall part and cylindricality of the cylindrical inner wall face of the cylindrical bearing are improved for improving concentricity of the rotor shaft and the cylindrical bearing which is slidably inserted into the through-hole of the bearing holder.

2. The motor according to claim 1, wherein a gate trace from which molding material for forming the cylindrical bearing is injected is formed at a center of the second end face.

3. The motor according to claim 1, wherein the second end face of the cylindrical bearing is urged in an axial direction of the rotor shaft by an urging member.

4. The motor according to claim 3, wherein the cylindrical bearing is slidably held in the through-hole in a state that a side wall part of the cylindrical bearing is maintained with a predetermined clearance to an inner peripheral face of the through-hole.

5. The motor according to claim 1, wherein a thickness (D1) between the groove and a side wall part of the cylindrical bearing which faces an inner peripheral face of the through-hole is roughly equal to a thickness (D2) between the groove and a circular recessed part which is formed at a center of the first end face.

6. The motor according to claim 5, wherein a thickness (D3) between a bottom face of the groove and one of the first end face and the second end face is roughly equal to the thickness (D1) between the groove and the side wall part of the cylindrical bearing and the thickness (D2) between the groove and the circular recessed part.

* * * * *